UNITED STATES PATENT OFFICE.

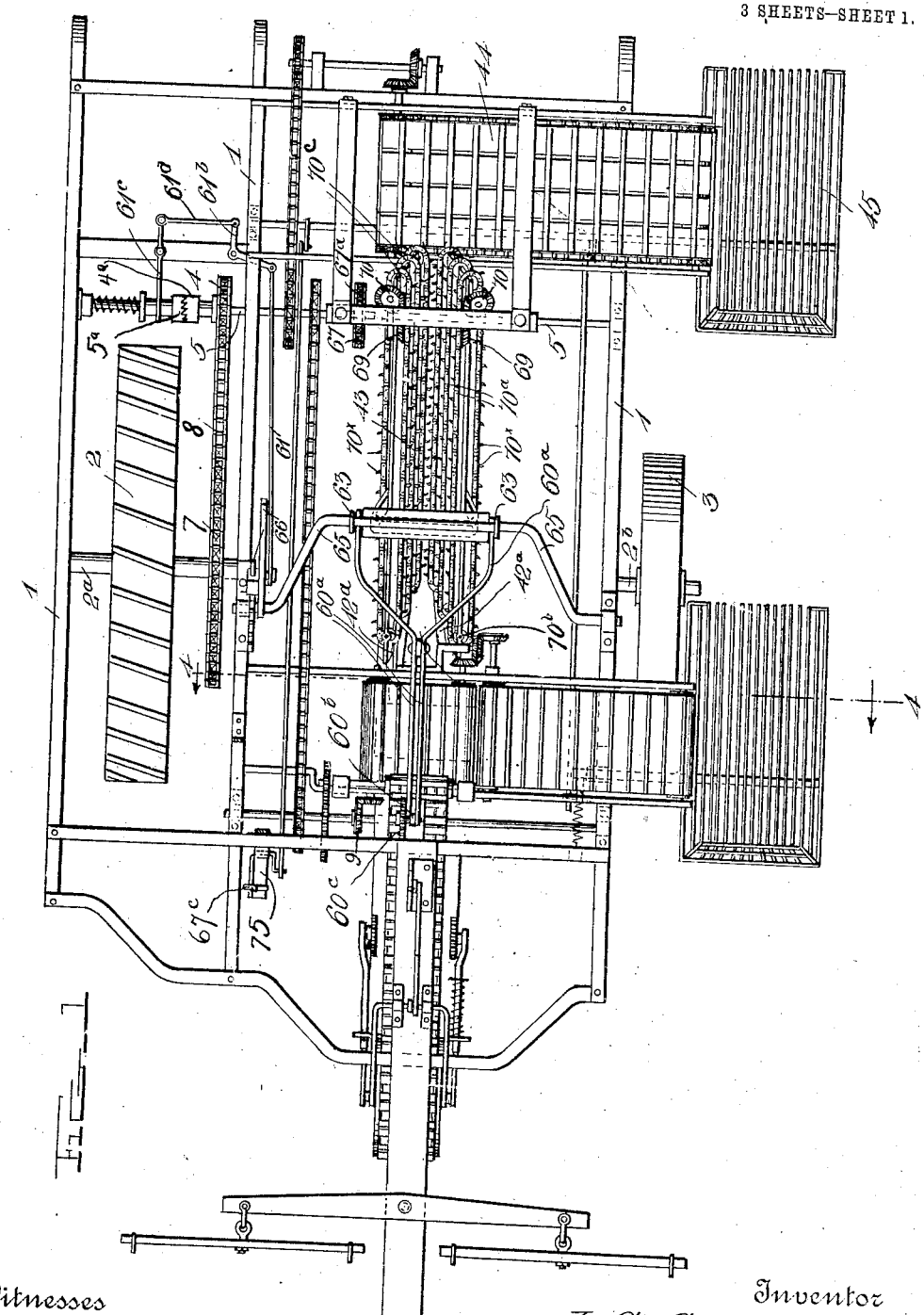

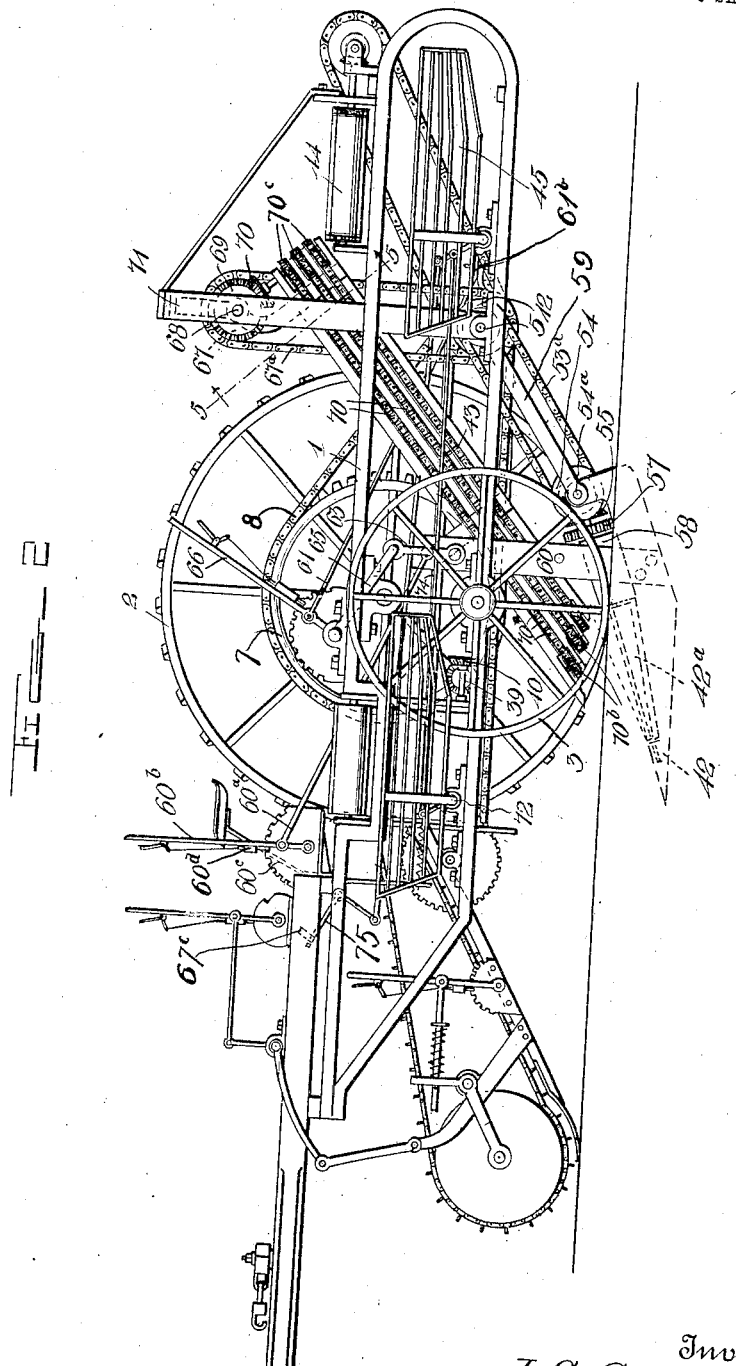

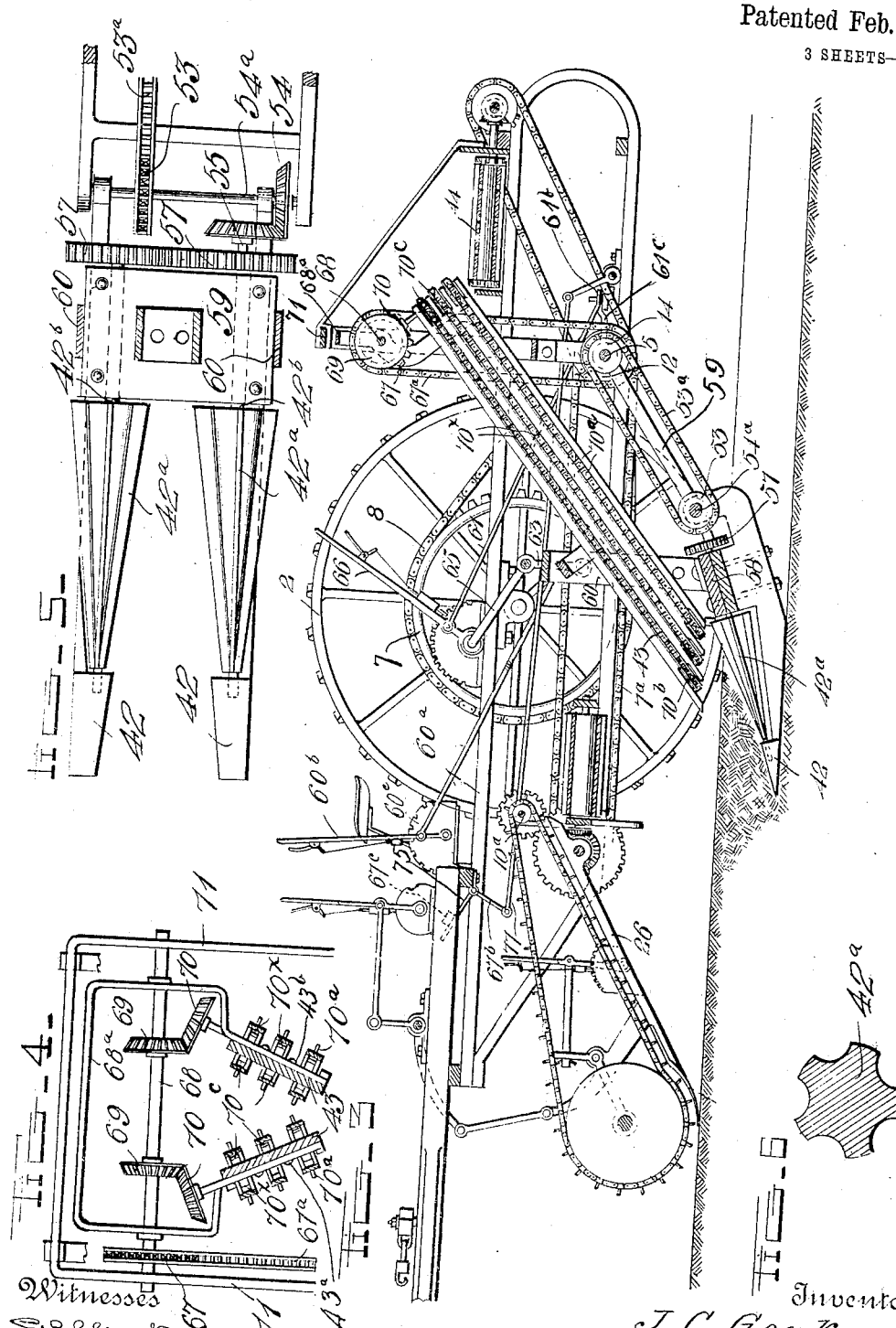

JOHN C. GERKEN, OF SAGINAW, MICHIGAN.

BEET-HARVESTER.

983,702.  Specification of Letters Patent.  Patented Feb. 7, 1911.

Application filed March 11, 1909. Serial No. 482,813.

*To all whom it may concern:*

Be it known that I, JOHN C. GERKEN, a citizen of the United States, residing at Saginaw, in the county of Saginaw and State of Michigan, have invented certain new and useful Improvements in Beet-Harvesters; and I do declare the following to be a full, clear, and exact description of the invention, such as will enable others skilled in the art to which it appertains to make and use the same.

This invention relates to improvements in beet harvesters.

The object of the invention is to provide simple and efficient means for digging beets and effecting the proper disposition of the beets after the removal thereof from the ground.

With this and other objects in view, the invention consists of certain novel features of construction, combination and arrangement of parts as will be more fully described and particularly pointed out in the appended claims.

In the accompanying drawings:—Figure 1 is a plan view of this improved harvester; Fig. 2 is a side elevation thereof; Fig. 3 is a central vertical longitudinal section; Fig. 4 is a transverse section taken on the line 4—4 of Fig. 1; Fig. 5 is a detail plan view of a pair of excavating members; and Fig. 6 is a detail transverse section of an excavating roller.

In the embodiment of the invention illustrated, a suitable supporting frame 1 is provided and is preferably mounted on a traction wheel 2 and a smaller wheel 3, said wheels being supported on suitable axles $2^a$ and $2^b$ journaled in said frame on opposite sides thereof.

A topping mechanism is shown in the drawings, but forms no part of the present invention.

A driving shaft 5 is journaled in the side members of the frame 1 and is provided with a pinion 4 around which is passed a driving chain 8 for engaging said shaft 5. This chain 8 also engages a sprocket wheel 7 fixed to the axle $2^a$ of the traction wheel 2 and receives motion therefrom.

A beet digging mechanism is mounted in the frame 1 and comprises shoes or pointed members 42 arranged side by side at a suitable inclination to enter the ground the desired distance necessary to excavate beets. These shoes 42 are provided with rotary ribbed rolls $42^a$ which are tapered longitudinally toward their front ends and are arranged in longitudinal alinement with said shoes and are adapted for co-action when rotated for effecting the immediate removal of the beets excavated by the shoes 42 to deliver said beets to an elevator 43 as hereinafter described. The axles or shafts $42^b$ of the rolls $42^a$ are suitably journaled in a boxing 58 suspended in position from a bail-like or cranked cross rod 65 by a supplementary frame 60 connected with said rod by links 63, and they are adapted for removing direct connection of the digging mechanism from the carrying axle of the machine.

The shafts $42^b$ of the rollers $42^a$ are provided with intergeared wheels, as 57, and one of said shafts is provided with a beveled pinion 55 which meshes with a similar pinion 54 fixed to a shaft $54^a$. This shaft $54^a$ is also equipped with a sprocket pinion 53 encompassed by a belt $53^a$ which also passes around a sprocket wheel 14 secured to the driving shaft 5 by means of which the rolls $42^a$ are driven through the shaft $54^a$, beveled gears 54 and 55, and intermeshing gears 57.

The axles or shafts 5 and $54^a$ are connected together by brace bars 59 whereby said shafts are retained in operative position. The members of the frame 60 carrying the shoes 42 are connected by links, as 63, to the cross bar of the cranked rod 65 and a lever 66 is pivoted on said cross rod 65 and is preferably connected by means of a rod 61 to the clutch actuating mechanism of the shaft 5. This rod 61 is connected at its rear end to one end of a bell crank lever $61^b$, the other end of said bell crank being connected by a link $61^d$ with one end of a clutch shifting lever $61^c$. This lever $61^c$ is fulcrumed intermediately of its ends to the frame 1 and the free end thereof is engaged with a sliding clutch member $5^a$ splined on the shaft 5 and adapted to be moved into and out of engagement with the complementary clutch member $4^a$ secured to the driving pinion 4 loosely mounted on the shaft 5 whereby said shaft may be thrown into and out of operation.

An elevator 43 mounted intermediately of the ends of the machine comprises laterally inclined members $43^a$ and $43^b$ (see Fig. 4) having arranged in their side portions a plurality of endless belts or chains 70ˣ which pass around sprocket wheels or pinions, as 70ᶜ, and 70ᵇ, hung in said side portions upon suitable shafts, the shafts of the upper wheels 70ᶜ being provided with beveled pinions 70 which mesh with pinions 69 secured upon a common shaft 68 supported in suitable uprights 71 secured to the frame 1. The shaft 68 is also provided with an additional pinion or sprocket wheel 67 driven from a pinion 12 on the drive shaft 5 by means of a belt 67ᵃ for transmitting motion to the endless chains or belts 70ˣ for elevating the excavated beets by means of hooks 70ᵃ attached to said chains or belts within the conveyer 43. The pinions 70 are held in operable connection with the gears 69 by a frame 68ᵃ which is mounted on the shaft 68 and connected at its lower ends with the elevator or conveyer guide members. The elevator 43 has its lateral members 43ᵃ and 43ᵇ arranged to form an approximately V-shaped outline for the effective elevating and delivering of its contents to a laterally discharging conveyer 44. This conveyer 44 is arranged at right angles to the elevator 43 and may be of any suitable or desired construction.

Arranged opposite the conveyer 44 for the delivery of the beets is preferably arranged a buncher 45 which may be of any suitable construction to receive the contents from the conveyer, said buncher being preferably pivotally supported upon the frame 1 and provided with suitable dumping means adapted to be actuated by a foot lever 75.

To raise and lower the upstanding members of the frame 60 and the excavating devices carried thereby, a forwardly extending link 60ᵃ is connected thereto and a lever 60ᵇ movable on a segmental rack 60ᶜ provided with a locking pawl 60ᵈ is connected with said link.

The foot lever 75 is preferably equipped with a toe strap 67ᵉ for retaining the foot of the operator thereon and said lever is operable when required for dumping the contents of the bunchers for the suitable delivery of their contents.

It will be noted from the foregoing description, that a machine constructed as herein described will greatly facilitate the ready removal of the beet tops and the excavation and harvesting of the beets themselves by a continuous operation.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:

1. In a beet harvester, a digging and lifting mechanism comprising excavator shoes, opposed conical rollers mounted on said shoes, means for actuating said rollers, an elevator arranged to receive the excavated beets from said rollers and having lateral members converging toward their lower edges and equipped with a plurality of vertically spaced endless belts provided with beet engaging means forming a conveying channel V-shaped in cross section, and actuating means for said belts and rollers.

2. A beet harvester comprising a wheeled supporting frame, an excavator supporting structure having excavating shoes mounted thereon and diverging from their inner toward their outer ends, rollers revolubly mounted on said shoes, shafts extending rearwardly from said rollers, intermeshing gears carried by said shafts, driving means connected with said gears, laterally spaced arms extending rearwardly from said supporting structure and provided with bearings at their free ends pivotally engaged with said structure, and means for raising and lowering said supporting structure.

3. In a beet harvester a wheeled supporting frame, a driving shaft journaled therein and operatively connected with one of the traction wheels for operation thereby, a cranked cross rod arranged transversely of said frame, an inverted U-shaped supporting frame, links connecting the legs of said supporting frame with said crank rod, a box mounted in said supporting frame between the legs thereof and with its rear end pivotally connected with said frame, a beet digging mechanism mounted in said box, and means connected with said crank rod for raising and lowering said beet digging mechanism.

In testimony whereof I have hereunto set my hand in presence of two subscribing witnesses.

JOHN C. GERKEN.

Witnesses:
FREDERICK J. LEE,
LAWRENCE FIELD.